United States Patent Office 3,817,918
Patented June 18, 1974

3,817,918
TERPOLYMER OF A POLYISOCYANATE, A POLY-
HYDROXYPHENOL, AND AN EPOXY RESIN
Carl Albert Aufdermarsh, Jr., Newark, Del., assignor to
E. I. du Pont de Nemours and Company, Wilmington,
Del.
No Drawing. Filed Mar. 31, 1972, Ser. No. 240,225
Int. Cl. C08g 30/04
U.S. Cl. 260—47 EP                               4 Claims

ABSTRACT OF THE DISCLOSURE

Elastomer-polyester composites are made with a two-coat adhesive system wherein the subcoat, applied to the polyester as an aqueous dispersion and cured at 204–244° C., is a terpolymer of a polyisocyanate, a polyhydroxyphenol, and an epoxy resin having high hydroxyl group content; the relative equivalent proportions of the monomers being about 1:(0.4–1):(0.05–0.70). This subcoat gives composites having the same desirable performance characteristics as the best prior art adhesive but does not present the prior art system's pollution hazards.

BACKGROUND OF THE INVENTION

This invention relates to a new polymeric composition useful in the preparation of a primary adhesive for polyester shaped structures, such as fibers and films, and especially for polyester tire cords.

Polyester tire cords have recently become important because they are stronger than the earlier rayon cords and because tires made with polyester cords do not have a tendency to develop flat spots, as do tires made with nylon cords. The fabrication of tires having polyester cords presented certain difficulties because the conventional adhesives used in the tire industries did not provide adequate adhesion to polyester. At an early stage of polyester cord development, separation of rubber and/or mechanical failure of the cords sometimes occurred, making such tires potentially hazardous.

A major step towards a solution of this problem was the development of a two-coat adhesive system, disclosed in U.S. Pat. 3,307,966. In this system, a polyester shaped structure, such as fiber or film, was first coated with a primary adhesive (subcoat) consisting essentially of a dispersion of a polyepoxide and a polyisocyanate in a liquid carrier. The polyisocyanate could contain free isocyanate groups but preferably was a blocked isocyanate, the blocking agent being, for example, phenol. A blocked the blocking agent being, for example, phenol. A blocked polyisocyanate was, of course, necessary when the liquid carrier was water because otherwise undesirable side-reactions of the isocyanate groups with water would occur. The second coat was a resorcinol-formaldehyde-latex composition (hereafter, RFL). This two-coat ad-having outstanding physical properties.

Before the RFL coating could be applied, the subcoat was cured at temperatures of 150–235° C. When a phenol-blocked polyisocyanate was employed in the subcoat composition, phenol was split off, and the free isocyanate groups formed in this step further reacted with the polyepoxide. The phenol was vented off from the curing oven. It is believed that a large portion of the phenol originally present in the blocked polyisocyanate was thus lost to the atmosphere, thus presenting a pollution hazard.

There is a need, therefore, for a water-dispersible adhesive system suitable for bonding an elastomer to a polyester shaped structure and providing a strong composite, wherein the pollution hazard during the application of the adhesive would be substantially reduced.

SUMMARY OF THE INVENTION

According to the present invention, there is now provided a subcoat formulation for a two-coat adhesive system for elastomer-polyester composites, the formulation consisting essentially of an aqueous dispersion of a novel random terpolymer of an aromatic or aliphatic polyisocyanate, a polyhydroxyphenol, and an epoxy resin having a high hydroxyl group content; the relative equivalent proportions of the component monomers being about 1:(0.4–1):(0.05–0.70), respectively; the amount of free —NCO groups in the terpolymer being less than about 4 weight percent; and the terpolymer content in the dispersion being about 2–15 weight percent.

The equivalent proportions are calculated for the polyisocyanate on the basis of —NCO groups and for the polyhydroxyphenol and the epoxy resin on the basis of the —OH groups.

The subcoat formulation of the present invention is coated on a polyester shaped article and cured at about 400–470° F. (204–244° C.). A top-coat of a second adhesive is then applied, and an elastomer-polyester composite is fabricated, substantially as discussed in the above-cited U.S. Pat. 3,307,966.

DETAILED DESCRIPTION OF THE INVENTION

Aromatic polyisocyanates, being less volatile and more reactive, are preferred to aliphatic polyisocyanates. Usually, the polyisocyanates will have two —NCO groups, but isocyanates having three —NCO groups also can be used in the preparation of the novel terpolymer of the present invention Typical, representative, suitable polyisocyanates include, for example, toluene-2,4-diisocyanate,
toluene-2,6-diisocyanate,
methylenebis(4-phenyl isocyanate),
triphenylmethanetriisocyanate,
m-phenylenediisocyanate,
polymethylenepoly(phenyl isocyanate),
hexamethylenediisocyanate,
cyclohexanediisocyanate,
m-xylene diisocyanate,
2,3-dimethyl-1,4-butanediisocyanate,
1-chlorobenzene-2,4-diisocyanate, and
methylenebis(cyclohexyl isocyanate).

A polyhydroxyphenol for the purpose of this disclosure is a compound having at least two phenolic hydroxyl groups, which do not necessarily have to be on the same benzene ring. A polyhydroxyphenol within the scope of this invention may also contain aliphatic groups, for example, a methylene bridge or a substituted methylene bridge, as well as a sulfur or oxygen bridge. Representative polyhydroxyphenols within the scope of this invention include resorcinol, hydroquinone, catechol, pyrogallol, 4,4′-methylenebis(phenol), 4,4′-isopropylidene-bisphenol or Bisphenol-A, tetrachloro-Bisphenol-A, 4,4′-diphenol, di(4-hydroxyphenyl) sulfone, and di(4-hydroxyphenol)ether.

The epoxy resin can be any available epoxy resin having an average molecular weight below about 3000 (as determined, for example, by vapor pressure osmometry), a melting point below about 150° C., and as high a hydroxyl group content as possible. Such resins usually are polyetherpolyepoxides and can be made, for example, by etherification of epichlorohydrin with glycerol or with another polyol. Many epoxy resins are commercially available under a variety of trade names. A particularly suitable epoxy resin is sold by Shell Chemical Co. under the trade name "Epon 812." This resin has 5.9–7.1 epoxide milliequivalents per gram, an epoxy functionality of about 2.2 groups per molecule, and 3–4 hydroxyl milliequivalents per gram. The hydroxyl content is somewhat difficult to ascertain because the well-known determination of hydroxyl number, involving reaction with acetic anhydride and titration of acetic acid, gives the sum of hydroxyl and epoxide groups. The epoxy groups content must be determined separately by reaction with excess hydrochloric acid in dioxane and back-titration of excess hydrochloric acid with alcoholic potassium hydroxide, and the appropriate correction is applied to obtain the hydroxyl content. For epoxide determination see, for example, S. Siggia, Quantitative Organic Analysis Via Functional Groups, Wiley and Sons (1967), p. 241. A desirable hydroxyl content should be at least about 0.5 milliequivalent per gram.

The preferred proportions of the component monomers are 1 equivalent of the polyisocyanate to 0.8-0.95 equivalent of the polyhydroxyphenol to 0.2-0.4 equivalent of the epoxy resin. Within this range, provided substantially all —NCO groups have reacted, the best stability and filterability of the terpolymer are obtained, and the best balance between epoxide functionality and urethane functionality is achieved for good adhesion.

The copolymerization of the polyisocyanate, polyhydroxyphenol, and epoxy resin can be carried out either in the absence or in the presence of an inert solvent, i.e., a solvent that does not react with isocyanate groups, hydroxyl groups, or epoxide groups. Suitable solvents include ethers, such as tetrahydrofuran or dioxane; hydrocarbons, such as benzene, toluene, cyclohexane, isooctane, and cycloheptane; chlorinated hydrocarbons, such as carbon tetrachloride, trichloroethylene, and tetrachloroethane; and acetonitrile. While it is preferred to use a solvent in which a true solution of the ingredients can be obtained, this is not an absolute requirement, and it is sufficient that a good dispersion is made. The main purpose of the solvent is to provide good agitation and heat dissipation.

The copolymerization is carried out in the presence of a catalyst. Many compounds are well known to catalyze isocyanate reactions with alcohols, and many are commercially available and used, for example, in the polyurethane industry. Most commonly used catalysts, which also are suitable in the process of the present invention, include various tin compounds as well as many tertiary amines. While most tertiary amines can be used, for example, tributylamine, N-methylpiperidine, N-methylmorpholine, and such, the most efficient amine type catalyst is triethylenediamine sold under the trade name "Dabco" (Air Products and Chemicals, Inc.). Tin catalysts include, for example, dibutyltin dilaurate, stannous octoate, and stannous oleate. In general, tin compounds are the preferred catalysts because tertiary amines may cause undesirable side reactions of the epoxy resin. The amount of the catalyst is about 0.01 to 0.5% based on the weight of the reaction components, exclusive of solvent.

The terpolymer can be formed either by simultaneous reaction of the polyisocyanate with the polyhydroxyphenol and the epoxy resin or by consecutive reactions of the polyisocyanate first with one hydroxy compound, then with the other. In practice, the simultaneous reaction is more advantageous because the reaction components are to some extent soluble in each other, and a homogeneous dispersion or solution is formed more readily when all are present at the same time. Normally, the polyisocyanate is added gradually with good agitation to the mixture of the resin and the polyhydroxyphenol containing the catalyst, the hydroxy compounds preferably being dissolved or dispersed in a nonreactive solvent. With some solvents, for example, trichloroethylene, the order of addition can be reversed to improve solubility and mixing of the components. The dispersion is maintained at a temperature of about 40-100° C. for sufficient time to substantially complete the reaction.

When the reaction is complete, there should be theoretically no free —NCO groups remaining in the product because such groups further react with water during the subcoat preparation, causing chain extension and carbon dioxide evolution. However, less than about 4 weight percent of free —NCO groups, based on the weight of the product, can be tolerated. The amount of free —NCO groups can be determined by the well-known dibutylamine titration technique, described by Siefken, in Liebigs Ann., 562, 75 (1949) or by S. Siggia et al. in Anal. Chem., 20, 1084 (1945). In this method, an aliquot of the product is allowed to react with excess dibutylamine in toluene, and the excess amine is titrated with standard hydrochloric acid. A modification of this technique uses excess n-butylamine in tetrahydrofuran. In order to avoid too large an amount of free —NCO groups, it is preferred to select the proportions of the polyhydroxyphenol and of the epoxy resin relative to the polyisocyanate so that an excess of about 10% of hydroxyl groups is present during the terpolymer preparation.

The terpolymer usually is insoluble in the solvent in which it was prepared. It can be filtered, washed if desired, and dried; if it is soluble, it can be recovered by evaporating the solvent; it then is ready for the next step. The terpolymer of the present invention can theoretically have a number average molecular weight within the range of about 1000 to 10,000. In practice, because of the presence of some unchanged epoxy resin and of other low molecular weight materials, the number average molecular weight of the unpurified terpolymer is about 1300-2000. The number average molecular weight can be determined by many techniques well known to a skilled polymer chemist. A quick and convenient method of molecular weight determination, based on the vapor pressure measurement of a polymer, involves vapor pressure osmometry in tetrahydrofuran, using Model 115 Hitachi-Perkin Elmer molecular weight apparatus.

The terpolymer is applied to polyester shaped articles, which may be in any convenient form, but usually will be in the form of film or fiber. An important such article is a tire cord. The polyester usually is poly(ethylene terephthalate), which is a well-known industrial polymer. Other polyesters also can be bonded to elastomers with a two-coat system, wherein the subcoat is based on the terpolymer of the present invention.

The adhesive formulation used to prepare the subcoat of the two-coat system is obtained by dispersing the terpolymer of the present invention in water. For good dispersion, it is advisable to grind the terpolymer to a fine particle size. Water is the most practical liquid carrier because it is the cheapest vehicle; it creates no pollution or fire hazard; and it does not under normal fabricating conditions attack the polyester material. A wetting agent is normally used for these aqueous dispersions. Many wetting agents are well known and are commercially available, including, for example, dioctylsodium sulfosuccinate and an alkyl aryl polyether alcohol ("Triton X-100," Rohm & Haas Co.). The preferred solids concentration in the dispersion is about 3-10 weight percent because it gives adequate pick-up on the polyester material for good adhesion. In addition to the terpolymer and the wetting agent, the dispersion may also contain up to about 3 weight percent of an epoxy resin, for example, the same epoxy resin as is used in the preparation of the terpolymer. Such additional epoxy resin often improves the physical properties of the composite, for example, by giving the polyester cord more flexibility.

The polyester material is dipped in, or continuously passed through, the terpolymer dispersion in water; the coating is dried and cured, both operations most conveniently being combined in one step. Curing is accomplished in an oven maintained at about 400-470° F. (204-244° C.) for a period of about 30 sec. to 5 minutes.

The oven advantageously is vented to remove water vapor and other volatile materials. It is to be noted that only minor amounts of such materials are evolved, and such materials are less volatile than, for example, those evolved in the process of U.S. Pat. 3,307,966. The only significant volatile component is the polyhydroxyphenol; only about 3% of the total resorcinol in the composition is volatilized. Below 204° C., the curing reaction either requires longer, impractical residence periods or does not occur to satisfactory degree. Above 244° C., degradation or mechanical deformation of the polyester material is likely. The dry pick-up of the terpolymer is about 0.2–1% by weight of the polyester article, the most practical range being about 0.3–0.6% because of good adhesion and strength.

The pre-coated shaped polyester article can be stored for several weeks; especially if protected from light and water, but normally is immediately coated with an RFL formulation and laminated to elastomer. The RFL coating can be made for example, as described in the above-mentioned U.S. Pat. 3,307,966 by mixing 73.7 g. of resorcinol, 40.0 g. of 37% formaldehyde, 148 ml. of water, and 480 ml. of a 41% solids butadiene/styrene/vinylpyridine (70/15/15) terpolymer latex, and allowing the mixture to age at room temperature for five days. The adhesive mixture is applied as the topcoat to the precoated polyester article, and the coated article is cured at about 218° C. for about 45 seconds. The total dry solids pick-up is about 2–6% per weight.

It is to be noted that various modified RFL topcoats can also be employed quite successfully. An EPDM elastomer, for example, can be bonded to polyester using a topcoat described in one of the following patents: U.S. 3,276,948, 3,502,603, and 3,367,827. The topcoat must, of course, be compatible with the elastomer.

The subcoat of this invention can be used in a two-coat system to bond polyester to a wide variety of elastomers, but the elastomer stocks should be compounded in such a manner that the performance and stability of the resulting composite would be at high level. For example, the curing system should not interact with the polyester material. Amine-based accelerators should preferably be avoided or kept at low level.

Typical elastomers that can be used in the fabrication of polyester-reinforced composites according to the present invention, are, for example, SBR, natural rubber, polyisoprene, and polybutadiene.

This invention is now illustrated by the following examples of certain representative embodiments thereof, wherein all parts, proportions, and percentages are by weight unless otherwise indicated.

EXAMPLE 1

(A) Epoxy Resin

The epoxy resin is prepared by contacting glycerol and epichlorohydrin in accordance with the disclosure of U.S. Pat. 2,902,398 (column 4, lines 1–24; "Polyether A"). This material is a pale yellow liquid with an epoxide equivalent of about 170, a corrected hydroxyl equivalent of about 300, and a viscosity of about 1.2–2.0 poises at 25° C.

This resin can also be obtained commercially from Shell Chemical Company under the trademark "Epon" Resin 812. The manufacturer warns that "Epon" 812 is harmful to skin; therefore, contact of this resin with the skin should be avoided.

(B) Polyurethane

The epoxy resin prepared in Step (A), above (143 grams; 0.4 mole), resorcinol (55 grams; 0.5 mole), and benzene (600 milliliters) are placed in a 3-liter round-bottom glass flask under nitrogen. The resulting mixture is heated with good agitation to about 50° C. After a few minutes at that temperature, the mixture becomes a homogeneous solution.

External heat is removed and 0.3 milliliter of dibutyltin dilaurate catalyst is added. Then a solution of 125 grams of methylenebis(4-phenylisocyanate) in 600 milliliters of benzene is introduced over a 15-minute period; during this interval the temperature rises to about 70° C., and a white solid precipitates. The mixture is stirred one hour at 70–80° C., cooled to 25° C., and filtered under suction. The resulting polyurethane is thus collected as a powdery solid adduct. After being washed with benzene and dried overnight at 40° C. in a vacuum desiccator, it weighs 237 grams. The polyurethane is soluble in tetrahydrofuran, has an epoxide equivalent of about 800, and has a number-average molecular weight of about 1400 (determined by vapor phase osmometry in a tetrahydrofuran solution at 35° C.).

(C) Preparation of Subcoat Dispersion

A 75-gram portion of the above-described polyurethane is pulverized and added to a mixture of 2.6 grams of sodium dioctylsulfosuccinate dispersing agent and 296.5 milliliters of water. The resulting composition is stirred briefly and then ball-milled for 46 hours at room temperature to give a fine dispersion containing 20% solids (by weight). During the ball-milling, one drop of 30% silicone emulsion (Dow Corning "Antifoam C," pH=3.9; specific gravity=1.0) is added to suppress foaming.

A 125-gram portion of 20% dispersion prepared above is diluted to 5% solids by addition to 375 grams of water (containing 0.32 gram of gum tragacanth) and stirred for three minutes. The resulting subcoat dispersion is ready to be applied to tire cord.

(D) RFL Outer Coating Composition

A resin master is prepared by adding 2.24 pounds of 1.7% aqueous sodium hydroxide (17 g. NaOH in 1000 g. water) to 27.8 pounds of water at 75–78° C. stirring for one minute, adding 1.38 pounds of resorcinol flakes slowly to the resulting solution, stirring for five minutes, adding 2.02 pounds of 37% aqueous formaldehyde, stirring for two minutes, stopping the mixing and aging the resin master at 75 to 78° F. for six hours. The pH is 7.0 to 7.5.

A latex composition is prepared by adding 7.64 pounds of water at 75–78° F. to 30.5 pounds of 41% "Gen-Tac" latex (containing a terpolymer of 1,3-butadiene/styrene/2-vinyl piperidine), adjusting the temperature to 45–50° F., adding 1.42 pounds of 28% aqueous ammonium hydroxide and stirring slowly for five minutes.

The resin master (33.44 pounds) is added to the above latex composition with slow mixing (which continues afterward for three more minutes). RFL Outer Coating Composition thus prepared is aged for 12 hours at 45–50° F. Its pH should then be 10.0 to 10.4. The composition is kept at 45–50° F. and may be used for 5 days.

(E) Application of Coating Compositions to Polyester Tire Cord

Polyethylene terephthalate tire cord having a 1000 (denier)/2 (ply-twist)/2 (ply-twist) construction [Du Pont's registered trademark for this cord is "Dacron" polyester fiber T-68] is dipped in the Subcoat Dispersion of Step (C), above, and then heated in an oven for one minute at 232° C. (450° F.) under an applied stretch of 8%. The percent pick-up (dry solids) is about 0.5.

The coated cord is then dipped in the above RFL Outer Coating Composition of Step (D) and then heated in an oven for one minute at 218° C. (425° F.) with a relaxation of 4% (i.e., −4% stretch). The total percent pick-up is about 3.6 weight percent.

(F) Rubber Compound

The Rubber Compound is prepared on a rubber roll mill according to the following recipe:

| Component: | Parts by weight |
|---|---|
| Natural Rubber (smoked sheet No. 1) | 50 |
| SBR–1500 [1] | 50 |
| HAF carbon black [2] | 35 |
| Stearic acid | 1 |
| Zinc oxide | 3 |
| Petroleum oil [3] | 9.37 |
| Antioxidant [4] | 1 |
| 2,2′-dithiobisbenzothiazole | 1 |
| Sulfur [5] | 3.13 |

[1] Non-pigmented sulfur curable elastomer made by copolymerizing 1,3-butadiene and styrene at 6° C. continuously in a continuous water phase using emulsifiers, viscosity regulators, and a redox catalyst system. It contains about 23.5% styrene by weight and has a Mooney viscosity (ML–1+4/100° C.) of 52.
[2] ASTM designation N–330 (Standard Classification System D1765–68, p. 860).
[3] Naphthenic petroleum oil ASTM D2226 Type 103 having Saybolt Universal Viscosity values of 2525 and 87.2 at 100° F. and 210° F., respectively, a molecular weight of 395, and a viscosity-gravity constant of 0.889 (Sun Oil Company's "Circosol 4240").
[4] Polymerized 2,2,4-trimethyl-1,2-dihydroquinoline, m.p. 74° C. (Monsanto's "Age Rite Resin D").
[5] Amorphous, insoluble sulfur with 20% oil (Stauffer Chemical's "Crystex").

(G) Two-Ply Strip Adhesion Pad for 2-Ply Strip Adhesion Test

A 15-mil 9 in. x 18 in. sheet of rubber stock is placed, backing side up, on a building drum; the backing is removed; tire cord is wound onto the drum across the full width using the maximum end count available without overlapping the cord; the freshly exposed side of another 15-mil 9 in. x 18 in. sheet of rubber stock is placed against the cords on the drum; and the assembly is stitched and removed from the drum. Two warps, each 8⅞ in. long and 9⅞ in. wide are cut.

Six 8⅞ in. x 9⅞ in. pieces of 125-mil rubber stock and two pieces of polyester fabric are cut. Two more pieces of 2 in. x 10 in. polyester fabric are cut.

A laminated structure is built up in successive layers. First, two of the 125-mil rubber sheets are joined (longer ends parallel). Then, successively, polyester fabric and one more 125-mil rubber sheet are positioned. One 8⅞ in. x 9⅞ in. warp is placed parallel to the 9 in. dimension; the side originally next to the building drum is down. Two 2 in. x 10 in. fabric strips are placed at both ends of the mold perpendicular to the cord direction. The other 8⅞ in. x 9⅞ in. warp is placed on top and in line with the first set (the side originally next to the building drum is up). The remaining layers are added to duplicate the first ply, two 125-mil sheets being the last to be positioned. The 2 in. x 10 in. fabric strips at the center of the pad allow a portion of each ply to remain free for clamping when testing.

The laminate is then molded, cured under pressure, and cut into one-inch wide strips. The force required to separate the two fabric plies of a one-inch wide strip is called the two-ply strip adhesion value.

In general the pad is cured at 6 tons total pressure for 60 minutes at 150° C.

2-Ply Strip Adhesion Test Results for Coated Polyester Tire Cords and Black Loaded Natural Rubber/SBR Stock Two-ply strip adhesion test pads are made using the coated polyester tire cord and the black loaded natural rubber/SBR-1500 stock described above. Some pads are tested at once at 140° C. (284° F.), others are aged at 162.8° C. (325° F.) for 8 hours.

The following results are typical:

| 2-ply strip adhesion at 140° C. (lbs./inch) | Unaged | Heat aged for 8 hours |
|---|---|---|
| Control, according to U.S. Pat. No. 3,307,966 | 52 | 21 |
| | 49 | 17 |

"H-pull" Adhesion

This test is done in accordance with ASTM method D2138–62T. It measures the force required to pull a single cord (axially) from a pair of parallel ¼-inch rubber blocks in which its ends are embedded. The specimen is in the shape of an "H," the exposed short length of the cord between the blocks forming the cross-bar. Stress is applied by gripping the blocks. This test was first described on pages 213–219 of India Rubber World, vol. 114 (1946).

"H-Pull" Adhesion Results for Coated Polyester Tire Cords and Black Loaded Natural Rubber/SBR Stock "H-pull" specimens are made using the coated polyester tire cord and the black loaded natural rubber/SBR–1500 stock described above. The unaged specimens typically have an "H-pull" adhesion value of about 15.3 lbs. at 140° C. The value obtained for a control composite, according to U.S. 3,307,966 is about 17.2 lbs. at 140° C.

EXAMPLE 2

Epoxy resin described in Example 1(A) (114 grams; 0.38 mole), 4,4′-isopropylidenbisphenol (125.5 grams; 0.55 mole), and benzene (400 milliliters) are agitated and heated to 82° C. under nitrogen to dissolve the phenol. External heat is removed, and 0.30 milliliter of dibutyltin dilaurate catalyst is added. Then a solution of 150 grams (0.6 mole) of methylenebis(4-phenyl isocyanate) in 300 milliliters of benzene is added over a period of 15 minutes. A taffy-like solid forms.

After the mixture has been agitated and refluxed at 81° C. for two hours, it is cooled to 20° C. Decantation of solvent gives a gummy solid which is dried overnight in a vacuum desiccator at 50° C. The resulting polyurethane is thus typically obtained as a brittle glassy solid (293 grams) which can be pulverized to a finely divided solid. This terpolymer can be used in aqueous dispersion as a subcoat for polyester shaped articles in manufacturing reinforced elastomer composites, as described in Example 1.

EXAMPLE 3

Epoxy resin described in Example 1(A) (114 grams; 0.38 mole), resorcinol (60.5 grams; 0.56 mole), and benzene (400 milliliters) are agitated and heated at 70° C. under nitrogen to form a suspension (which partially dissolves). External heat is removed and 0.3 milliliter of dibutyltin dilaurate is added. Then a solution of 2,4-toluenediisocyanate (104.5 grams; 0.60 mole) in 300 milliliters of benzene is added over a 15-minute period. A soft, taffy-like semi-solid separates.

After the mixture has been agitated and refluxed for two hours, it is cooled to 20° C. Removal of solvent leaves a hard, glassy terpolymer, which is crushed and dried in a vacuum desiccator at 60° C. overnight. Yield: about 198 grams of friable white powder. This material contains the following equivalent proportions of the component monomers: 1.20 equivalents of polyisocyanate, 1.12 equivalents of polyhydroxyphenol, and 0.38 equivalent of epoxy resin. It can be used in aqueous dispersion as as subcoat in the manufacturing of polyester-reinforced elastomer composites, as described in Example 1.

In this specification and claims, the expression "consisting essentially of" means that in addition to the recited components the composition may also contain other components, provided they do not adversely affect the effectiveness of the composition for its intended use.

I claim:
1. A random terpolymer of an aromatic or aliphatic polyisocyanate, a polyhydroxyphenol, and an epoxy resin containing more than one oxirane group having at least 0.5 milliequivalent of hydroxyl groups per gram; the relative equivalent proportions of the component monomers being about 1 to 0.4–1 to 0.05–0.70, respectively; the amount of free —NCO groups being less than about 4 weight percent, based on the weight of the product; and the number average molecular weight of the terpolymer being about 1000 to 10,000.

2. A copolymer of Claim 1 wherein the equivalent proportions of component monomers are: 1 equivalent of polyisocyanate to 0.8–0.95 equivalent of polyhydroxyphenol to 0.2–0.4 equivalent of epoxy resin.

3. The terpolymer of Claim 1 wherein the polyisocyanate is methylenebis(4-phenyl isocyanate); the polyhydroxyphenol is resorcinol; and the hydroxyl content of the epoxy resin is about 3–4 milliequivalents per gram.

4. The terpolymer of Claim 1 whose number average molecular weight is about 1300–2000.

References Cited
UNITED STATES PATENTS
3,634,327   1/1972   Hawkins _____ 260—47
3,307,966   3/1967   Shoaf _____ 117—161 X WILLIAM H. SHORT, Primary Examiner T. E. PERTILLA, Assistant Examiner U.S. Cl. X.R.

117—76 T, 138.8 F, 139; 161—184; 260—47 EC, 49, 77.5 AM, 830 R